United States Patent
Pang et al.

(10) Patent No.: US 9,713,135 B2
(45) Date of Patent: Jul. 18, 2017

(54) METHOD AND APPARATUS FOR ESTABLISHING A STANDALONE HIGH SPEED DEDICATED PHYSICAL CONTROL CHANNEL

(71) Applicant: HUAWEI TECHNOLOGIES CO., LTD., Shenzhen, Guangdong (CN)

(72) Inventors: Lingli Pang, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 14/467,349

(22) Filed: Aug. 25, 2014

(65) Prior Publication Data
US 2015/0003376 A1    Jan. 1, 2015

Related U.S. Application Data

(63) Continuation of application No. PCT/CN2012/084509, filed on Nov. 13, 2012.

(30) Foreign Application Priority Data

Feb. 29, 2012 (CN) .......................... 2012 1 0049951

(51) Int. Cl.
*H04W 72/04* (2009.01)
*H04W 72/08* (2009.01)
(Continued)

(52) U.S. Cl.
CPC ......... *H04W 72/042* (2013.01); *H04L 1/1887* (2013.01); *H04L 1/0026* (2013.01); *H04L 1/189* (2013.01); *H04L 5/0053* (2013.01)

(58) Field of Classification Search
CPC ............ H04L 5/0053; H04W 72/0413; H04W 72/042; H04W 72/0433; H04W 74/006; H04W 72/04; H04W 72/0406
See application file for complete search history.

(56) References Cited

U.S. PATENT DOCUMENTS

| | | | |
|---|---|---|---|
| 2001/0018342 A1* | 8/2001 | Vialen ................. | H04W 76/028 455/423 |
| 2003/0099255 A1* | 5/2003 | Kekki ................. | H04B 7/2612 370/469 |

(Continued)

FOREIGN PATENT DOCUMENTS

| | | |
|---|---|---|
| CN | 1960562 A | 5/2007 |
| CN | 101335983 A | 12/2008 |

(Continued)

OTHER PUBLICATIONS

Qualcomm et al., 3GPP TSG-RAN-WG1 Meeting #66bis R1-113522, "LS on RAN1 agreements on Further Enhancements for Cell_FACH", Oct. 10-14, 2011, 1 page.*

(Continued)

*Primary Examiner* — Scott M Sciacca

(57) ABSTRACT

A method and a related apparatus establish a standalone high speed dedicated physical control channel (Standalone HS-DPCCH) between a base station and a user terminal in a wireless communication system based the capabilities of the user terminal. The base station receives from a radio network controller of the wireless communication system downlink data which includes indication information indicating that the user terminal is capable of establishing a Standalone HS-DPCCH. After receiving the indication data, the base station sends trigger information to the user terminal to trigger the user terminal to establish a Standalone HS-DPCCH between the user terminal and the base station.

8 Claims, 5 Drawing Sheets

---

A radio network controller generates indication information, where the indication information is used for indicating whether a user terminal supports a Standalone HS-DPCCH or whether the radio network controller requires a base station to establish a standalone HS-DPCCH for a user terminal, and sends downlink data including the indication information to the base station — 101

The base station receives the indication information sent by the radio network controller, and sends trigger information to the user terminal that supports the Standalone HS-DPCCH, so as to trigger the establishment of the Standalone HS-DPCCH — 102

(51) Int. Cl.
  *H04L 1/18* (2006.01)
  *H04L 1/00* (2006.01)
  *H04L 5/00* (2006.01)

(56) References Cited

U.S. PATENT DOCUMENTS

| | | | |
|---|---|---|---|
| 2007/0030828 A1 | 2/2007 | Vimpari et al. | |
| 2008/0182594 A1* | 7/2008 | Flore | H04W 76/046 455/458 |
| 2009/0253422 A1* | 10/2009 | Fischer | H04W 48/08 455/418 |
| 2011/0038347 A1* | 2/2011 | Patil | H04W 36/0055 370/331 |
| 2011/0086656 A1* | 4/2011 | Zhou | H04W 8/24 455/507 |
| 2011/0207498 A1* | 8/2011 | Wang | H04L 25/00 455/522 |
| 2011/0287774 A1* | 11/2011 | Li | H04W 76/048 455/452.1 |
| 2013/0044663 A1* | 2/2013 | Mohan | H04W 74/0858 370/311 |
| 2013/0143617 A1* | 6/2013 | Cea | H04W 52/241 455/522 |
| 2015/0016366 A1* | 1/2015 | Ranta-Aho | H04W 74/002 370/329 |

FOREIGN PATENT DOCUMENTS

| | | |
|---|---|---|
| EP | 1954065 A1 | 8/2008 |
| EP | 2309788 A1 | 4/2011 |
| EP | 2315471 A1 | 4/2011 |
| JP | 2009527932 A | 7/2009 |
| RU | 2396718 C2 | 8/2010 |
| WO | 2004049648 A2 | 6/2004 |
| WO | 2010013526 A1 | 2/2010 |
| WO | 2011063050 A1 | 5/2011 |
| WO | 2013097908 A1 | 7/2013 |

OTHER PUBLICATIONS

3GPP TSG RAN WG1 Meeting #67 R1-113849,"Stand-alone HS-DPCCH in CELL_FACH",Huawei et al, Nov. 14-18, 2011,total 4 pages.

3GPP TSG-RAN WG3 #75bis; RAN3 impacts on standalone HS-DPCCH; Huawei; R3-120566; Agenda Item: 14.3; San Jose del Cabo, Mexico, Mar. 26-30, 2012; total 2 pages.

3GPP TS 25.308 V11.0.0; 3rd Generation Partnership Project-;Technical Specification Group Radio Access Network; High Speed Downlink Packet Access (HSDPA);Overall description;Stage 2(Release 11); Dec. 2011;total 69 pages.

3GPP TS 25.433 V11.0.0; 3rd Generation Partnership Project-;Technical Specification Group Radio Access Network; UTRAN lub interface Node B Application Part (NBAP) signalling(Release 11); Dec. 2011; total 1285 pages.

3GPP TS 25.435 V10.4.0; 3rd Generation Partnership Project; Technical Specification Group Radio Access Network; UTRAN lub interface user plane protocols for Common Transport Channel data streams(Release 10); Dec. 2011; total 61 pages.

\* cited by examiner

METHOD AND APPARATUS FOR ESTABLISHING A STANDALONE HIGH SPEED DEDICATED PHYSICAL CONTROL CHANNEL

CROSS-REFERENCE TO RELATED APPLICATIONS

This application is a continuation of International Application No. PCT/CN2012/084509, filed on Nov. 13, 2012, which claims priority to Chinese Patent Application No. 201210049951.9, filed on Feb. 29, 2012, all of which are hereby incorporated by reference in their entireties.

TECHNICAL FIELD

Embodiments of the invention relate to the field of communications technologies, and in particular, to a method and an apparatus for establishing a standalone high speed dedicated physical control channel.

BACKGROUND

A new uplink physical layer control channel is introduced in a high speed downlink packet access (HSDPA) technology, and is also known as a high speed dedicated physical control channel (HS-DPCCH) in a wideband code division multiple access (WCDMA) system.

A function of the HS-DPCCH is to bear necessary control signaling in an uplink, which includes channel quality indicator (CQI) information and hybrid automatic repeat request (HARQ) feedback information, where the HARQ feedback information is generated by a user terminal (UE) after the user terminal receives downlink data from a network side, and specifically includes acknowledgement (ACK) information and negative acknowledgement (NACK) information.

A standalone high speed dedicated physical control channel (Standalone HS-DPCCH) is a new feature, and refers to an HS-DPCCH established as triggered by the network side, and a UE supporting the new feature may establish a Standalone HS-DPCCH after receiving trigger information from the network side. The network side may send the trigger information to the UE through a high speed shared control channel (HS-SCCH). When the UE is triggered to establish the Standalone HS-DPCCH, the UE needs to obtain an uplink resource through competition in a random access process, where the uplink resource includes configuration information of the HS-DPCCH.

Because the Standalone HS-DPCCH is a new feature, a case that a part of UEs do not support the new feature exists in a network. If a base station (Node B) delivers trigger information to a UE that does not support a Standalone HS-DPCCH capability, a waste of HS-SCCH resources is caused, and a delay of downlink data scheduling of the UE may also be caused.

SUMMARY

In multiple aspects of the present invention, a method and an apparatus for establishing a standalone high speed dedicated physical control channel are provided, to avoid a waste of HS-SCCH resources and reduce a delay of downlink data scheduling of a UE.

In an aspect of the present invention, a method for establishing a standalone high speed dedicated physical control channel is provided and includes: receiving, by a base station, indication information sent by a radio network controller, where the indication information is used for indicating that a user terminal supports a Standalone HS-DPCCH or the radio network controller requires the base station to establish a standalone HS-DPCCH for a user terminal; and sending, by the base station, trigger information to the user terminal that supports the Standalone HS-DPCCH, so as to trigger the establishment of the Standalone HS-DPCCH.

In another aspect of the present invention, a method for establishing a standalone high speed dedicated physical control channel is provided and includes: generating, by a radio network controller, indication information, where the indication information is used for indicating that a user terminal supports a Standalone HS-DPCCH or a base station is required to establish a standalone HS-DPCCH for a user terminal; and sending, by the radio network controller, the indication information to the base station, so that the base station sends trigger information to the user terminal that supports the Standalone HS-DPCCH.

In another aspect of the present invention, a base station is provided and includes: a receiving module, configured to receive indication information sent by a radio network controller, where the indication information is used for indicating that a user terminal supports a Standalone HS-DPCCH or the radio network controller requires the base station to establish a standalone HS-DPCCH for a user terminal; and a receiving module, configured to receive indication information sent by a radio network controller, where the indication information is used for indicating that a user terminal supports a Standalone HS-DPCCH or the radio network controller requires the base station to establish a standalone HS-DPCCH for a user terminal.

In another aspect of the present invention, a radio network controller is provided and includes: a generating module, configured to generate indication information, where the indication information is used for indicating whether a user terminal supports a Standalone HS-DPCCH or whether a base station is required to establish a standalone HS-DPCCH for a user terminal; and a sending module, configured to send the indication information to the base station, so that the base station sends trigger information to the user terminal that supports the Standalone HS-DPCCH.

In the technical solutions in the embodiments of the present invention, a waste of HS-SCCH resources may be avoided, and a delay of downlink data scheduling of a UE may also be reduced.

DESCRIPTION OF EMBODIMENTS

Figure 1:
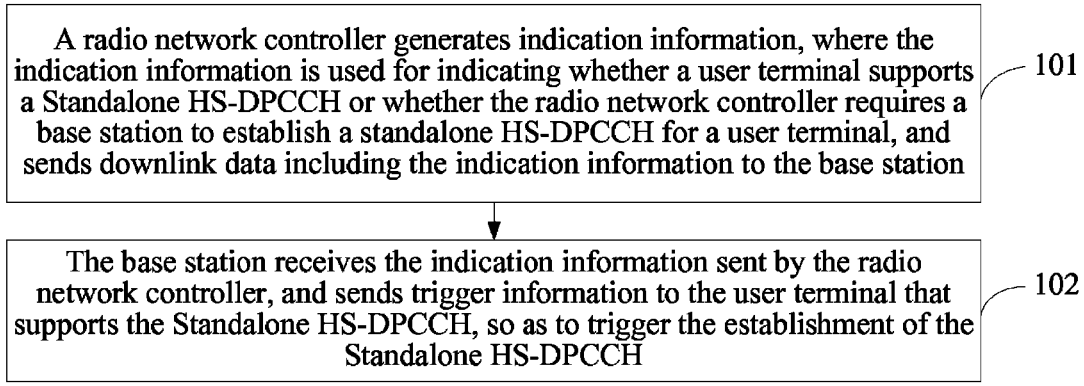
FIG. 1 is a flow chart of a method for establishing a standalone high speed dedicated physical control channel according to an embodiment of the present invention.

An embodiment of the present invention provides a method for establishing a standalone high speed dedicated physical control channel, where a radio network controller sends indication information to a base station, and notifies the base station of information whether a UE supports a Standalone HS-DPCCH, so that the base station may send trigger information to a UE that supports a Standalone HS-DPCCH, and does not need to send the trigger information to a UE that does not support a Standalone HS-DPCCH; therefore, a waste of HS-SCCH resources may be avoided, and a delay of downlink data scheduling of a UE may also be reduced. An embodiment of the present invention further provides a corresponding apparatus. Details are described in the following.

In the following description, for the purpose of description instead of limitation, specific details about specific system structures, interfaces, technologies and so on are provided for thorough understanding of the present invention. However, persons skilled in the art should understand that, the present invention may also be implemented in other embodiments without these specific details. In other cases, detailed description of well-known apparatuses, circuits and methods are omitted to prevent unnecessary details from affecting the description of the present invention.

Technologies described herein may be applicable to various types of communication systems, for example, current 2G and 3G communication systems and a next generation communication system, such as a global system for mobile communications (GSM), a code division multiple access (CDMA) system, a time division multiple access (TDMA) system, wideband code division multiple access (WCDMA), a frequency division multiple access (FDMA) system, an orthogonal frequency-division multiple access (OFDMA) system, a single carrier FDMA (SC-FDMA) system, a general packet radio service (GPRS) system, a long term evolution (LTE) system, and other communication systems of this types.

Various aspects are described in combination with a user device and/or a base station and/or a base station controller herein.

The user device may be a wireless terminal and may also be a wired terminal. The wireless terminal may refer to a device that provides voice and/or data connectivity for a user, a handheld device that has a wireless connection function, or any other processing device that is connected to a wireless modem. The wireless terminal may communicate with one or more core networks through a radio access network (for example, RAN). The wireless terminal may be a mobile terminal, such as a mobile phone (or called "cellular" phone) and a computer that has a mobile terminal, which, for example, may be a portable, pocket-size, handheld, computer-integrated or vehicle-mounted mobile apparatus, which exchanges a language and/or data with the radio access network. For example, the wireless terminal may be a device such as a personal communication service (PCS) telephone, a cordless telephone, a session initiation protocol (SIP) phone, a wireless local loop (WLL) station, and a personal digital assistant (PDA). The wireless terminal may also be called a system, a subscriber unit, a subscriber station, a mobile station, a mobile station, a remote station, an access point, a remote terminal, an access terminal, a user terminal, a user agent, a user device, or a user equipment.

The base station (for example, an access point) may refer to a device that communicates with a wireless terminal through one or more sectors on an air interface in an access network. The base station may be configured to perform mutual conversion between a received air frame and an IP packet, and serves as a router between the wireless terminal and a rest part of the access network, where the rest part of the access network may include an Internet protocol (IP) network. The base station may further coordinate attribute management of the air interface. For example, the base station may be a base station (BTS, Base Transceiver Station) in the GSM or CDMA, may be a base station (NodeB) in the WCDMA, and may further be an evolved base station (NodeB or eNB or e-NodeB, evolved Node B) in the LTE, which is not limited in the present invention.

The base station controller may be a base station controller (BSC) in the GSM or CDMA, and may also be a radio network controller (RNC) in the WCDMA, which is not limited in the present invention.

Further, terms "system" and "network" may always be exchanged for use herein. A term "and/or" herein is merely an association relationship for describing associated objects, and indicates that three relationships may exist. For example, A and/or B may indicate three cases: only A exists, both A and B exist, and only B exists. A character "/" herein generally indicates that the former and latter associated objects are in an "or" relationship.

Referring to FIG. 1, an embodiment of the present invention provides a method for establishing a standalone high speed dedicated physical control channel (Standalone HS-DPCCH).

101: A radio network controller (RNC) generates indication information, where the indication information is used for indicating that a user terminal supports a Standalone HS-DPCCH or a Node B is required to establish a standalone HS-DPCCH for a UE, and sends the indication information to the base station (Node B).

Generally, before sending downlink data for the UE to the Node B, the RNC already acquires capability information of the UE by interacting with the UE, where the capability information of the UE includes whether the UE supports a new feature, namely, the Standalone HS-DPCCH.

Moreover, before sending the indication information to the Node B, the RNC may also acquire, by interacting with the Node B, a capability, reported by the Node B, that the Node B supports the standalone HS-DPCCH feature, and/or a capability, reported by the Node B, that a certain cell under the Node B supports the standalone HS-DPCCH feature. The Node B may report, to the RNC, through an audit response message in an audit process and/or a Resource status Indication in a resource status indication process, information that the Node B or a certain cell under the Node B supports the standalone HS-DPCCH feature. According to the capability reported by the Node B, the RNC delivers the indication information to the Node B that supports the capability or delivers the indication information to the Node B to which the cell that supports the feature belongs.

When the RNC delivers parameter information related to the standalone HS-DPCCH to the Node B that supports the standalone HS-DPCCH or to the Node B to which the cell that supports the standalone HS-DPCCH belongs, the RNC needs to deliver configuration information of a timer for resource release of the standalone HS-DPCCH. According to the configuration information delivered by the RNC, when implicit resource release is valid, the UE sends resource release instruction information to the Node B after the timer times out, to complete release of a resource. When explicit resource release is valid, the UE waits for a release instruction of the Node B to decide release of a resource. The Node B may schedule the UE with reference to information of the timer, thereby avoiding frequent resource acquisition and release. The information of the timer may be included in a physical shared channel reconfiguration request (PHYSICAL SHARED CHANNEL RECONFIGURATION REQUEST), or in common E-DCH system information.

When the RNC delivers parameter information related to the standalone HS-DPCCH to the Node B that supports the standalone HS-DPCCH or to the Node B to which the cell that supports the standalone HS-DPCCH belongs, the RNC may also deliver information of one or more signatures corresponding to the standalone HS-DPCCH to the NodeB, and when triggering the establishment of the standalone HS-DPCCH, the Node B selects the information of one or more signatures and includes the selected information in an HS-SCCH to be sent to the UE, so as to trigger the UE to establish the standalone HS-DPCCH.

When sending the downlink data for the UE to the Node B, the RNC may generate indication information used for indicating that the user terminal supports a Standalone HS-DPCCH or indication information that a standalone HS-DPCCH needs to be established for the UE, and send the indication information to the Node B. Generally, the RNC may carry the indication information in a frame protocol (Frame Protocol, FP) frame, for example, a frame protocol FP frame of the downlink data for the UE or a control frame for a certain UE.

Currently, a reserved field that has not been used in the prior art exists in the FP of the downlink data of the UE, and the reserved field may be used to indicate whether the user terminal supports the Standalone HS-DPCCH, for example, a character 1 may be filled in the reserved field to represent supporting, and a character 0 may be filled in the reserved field to represent not supporting, and vice versa; certainly, other characters may also be filled in for representation, which is not limited herein.

The user terminal and a network side have four connection statuses, where in a cell forward access channel status (Cell_FACH) and a cell paging channel status (Cell_PCH), the user terminal may be triggered to establish the Standalone HS-DPCCH.

Figure 2:
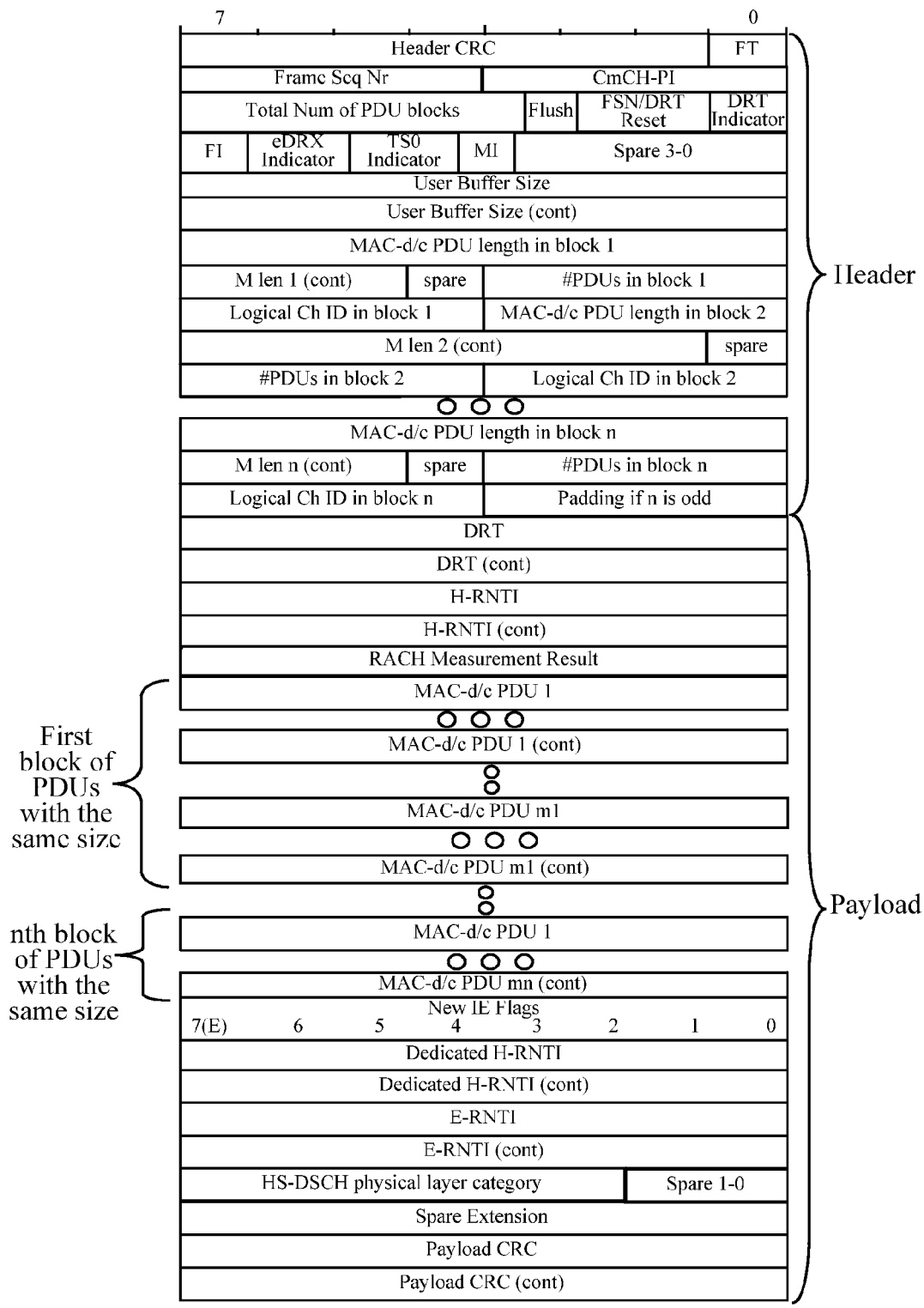
FIG. 2 is a schematic format diagram of an HS-DSCH DATA FRAME TYPE 2 according to another embodiment of the present invention.
Figure 3:
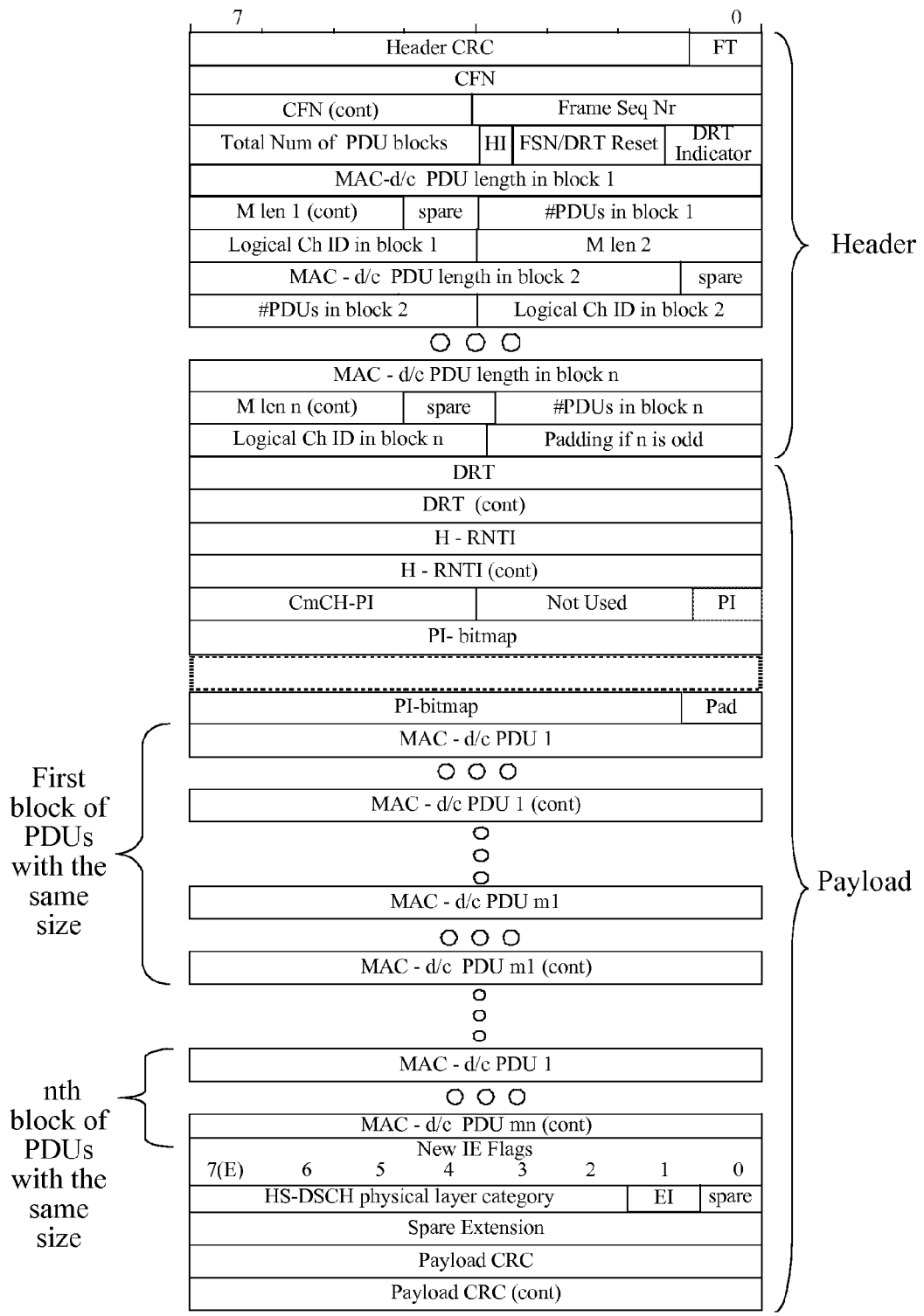
FIG. 3 is a schematic format diagram of an HS-DSCH DATA FRAME TYPE 3 according to another embodiment of the present invention.

If the user terminal is in the cell forward access channel status, the RNC may specifically carry the indication information in a data frame type 2 (DATA FRAME TYPE 2) of a high speed downlink shared channel (HS-DSCH). The HS-DSCH DATA FRAME TYPE 2 has several reserved spare fields that have not been used in the prior art, for example, a Spare 3-0 field in a header part, a Spare 1-0 field in a payload part, and a spare extension field. In this embodiment, the indication information used for indicating whether the user terminal supports the Standalone HS-DPCCH may be specifically carried in the Spare field. The RNC may also carry the indication information in an existing field that has already been used, for example, UE identifiers of some types, such as H-RNTI/E-RNTI, represent that the user terminal supports the standalone HS-DPCCH; or when an HS-DSCH physical layer category of the UE satisfies a certain requirement, it indicates that the user terminal supports the standalone HS-DPCCH. In an implementation manner, a format of the HS-DSCH DATA FRAME TYPE 2 may be shown in FIG. 2.

If the user terminal is in the cell paging channel status, the RNC may specifically carry the indication information in a data frame type 3 (DATA FRAME TYPE 3) of the HS-DSCH. The HS-DSCH DATA FRAME TYPE 3 has several reserved spare fields that have not been used in the prior art, for example, a Spare field, a Not Used field, a Pad field, and a spare extension field shown in the figure. In this embodiment, the indication information used for indicating whether the user terminal supports the Standalone HS-DPCCH may be specifically carried in any one of the Spare field, Not Used field, Pad field and spare extension field. The RNC may also carry the indication information in an existing field that has already been used, for example, UE identifiers of some types, such as H-RNTI/E-RNTI, represent that the user terminal supports the standalone HS-DPCCH; or when an HS-DSCH physical layer category of the UE satisfies a certain requirement, it indicates that the user terminal supports the standalone HS-DPCCH. In an implementation manner, a format of the HS-DSCH DATA FRAME TYPE 3 may be shown in FIG. 2.

It should be noted that, when the user terminal is in the cell forward access channel status, the indication information may also be carried in the FRAME TYPE 3; and when the user terminal is in the cell paging channel status, the indication information may also be carried in the DATA FRAME TYPE 2. Reference may be made to the foregoing description for a specific carrying manner.

102: The base station receives downlink data which includes the indication information and is sent by the radio network controller; and sends trigger information to the user terminal that supports the Standalone HS-DPCCH, so as to trigger the establishment of the Standalone HS-DPCCH.

The Node B receives the indication information sent by the RNC, and acquires whether to send trigger information of the Standalone HS-DPCCH to the user terminal. When triggering the UE to establish the Standalone HS-DPCCH, the Node B may send the trigger information to the user terminal that supports the Standalone HS-DPCCH, and does not need to send the trigger information to the user terminal that does not support the Standalone HS-DPCCH.

After receiving the indication information sent by the RNC, the Node B may not trigger the user terminal to establish the standalone HS-DPCCH.

The trigger information sent by the Node B is transferred to the UE through the HS-SCCH. By using the method in the embodiment of the present invention, the amount of the trigger information sent by the Node B to the HS-SCCH may be reduced, to avoid a waste of HS-SCCH resources and further reduce a delay of downlink data scheduling of the UE.

After receiving the indication information from the RNC, the Node B may immediately trigger the UE to establish the Standalone HS-DPCCH; however, due to limitation of scheduling, the Node B may not immediately trigger the UE to establish the standalone HS-DPCCH, or after the Node B triggers the UE to establish the standalone HS-DPCCH, a certain establishment delay exists when the UE establishes the standalone HS-DPCCH.

A delay time exists from time when the Node B receives an indication information to time when the standalone HS-DPCCH is successfully established, and if the RNC continues sending data for the UE to the Node B in the delay time, buffering of the Node B is impacted. To reduce the impact, in the standalone HS-DPCCH feature, the RNC may continue sending the downlink data for the UE only after the UE successfully establishes the standalone HS-DPCCH, and the following several implementation manners exist in a specific application:

Manner 1:

When receiving the downlink data which includes the indication information and is sent by the RNC, the Node B needs to trigger the UE to establish the standalone HS-DPCCH; however, due to a scheduling or establishment delay, the downlink data of the UE cannot be immediately scheduled, and the Node B may send, to the RNC, reject information, instructing the RNC to suspend sending the downlink data for the UE in a specified time period. Optionally, the RNC may continue sending the downlink data for the UE after the specified time period.

Figure 4:
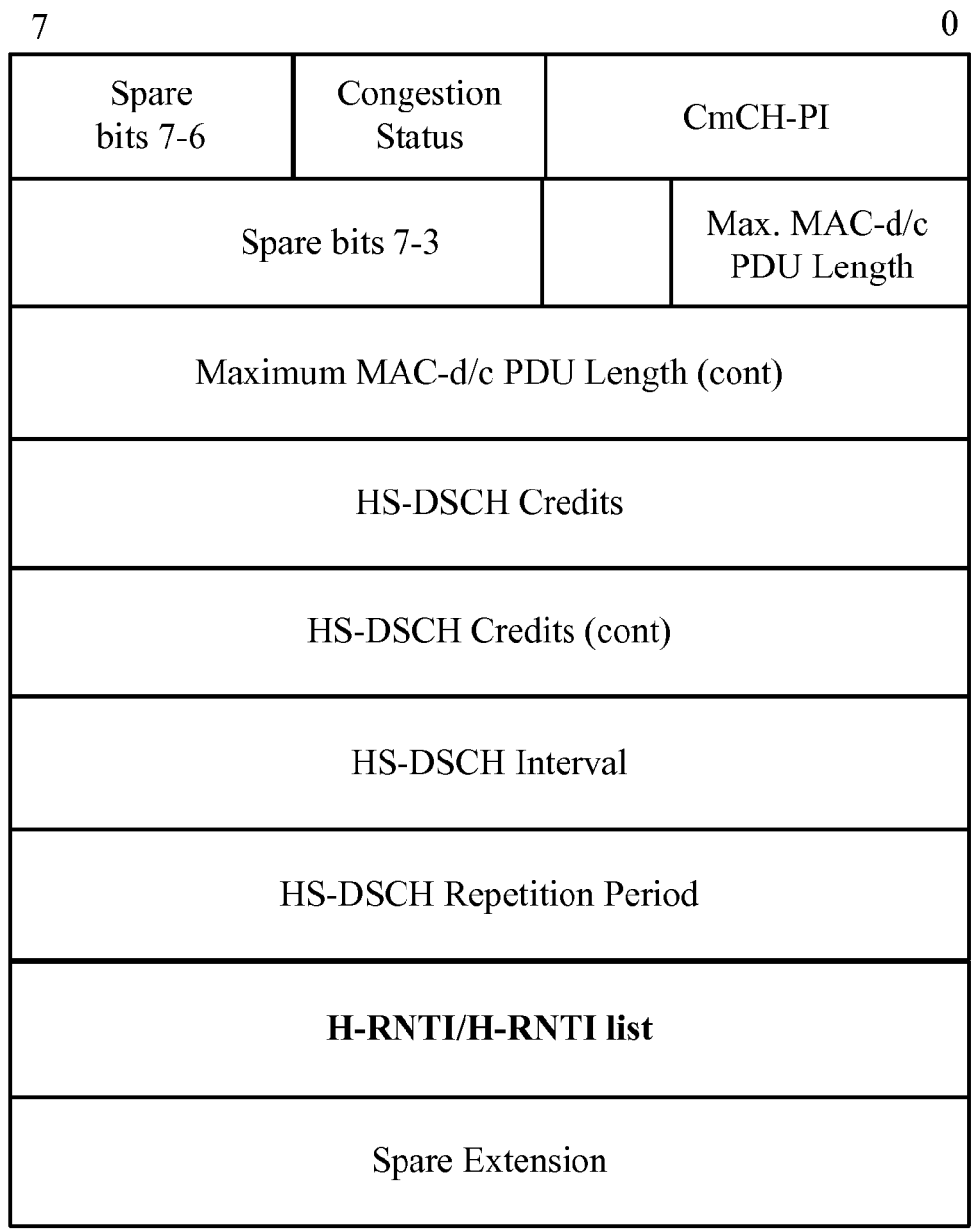
FIG. 4 is a schematic format diagram of an HS-DSCH CAPACITY ALLOCATION control frame according to another embodiment of the present invention.

The reject information may be included in an HS-DSCH capacity allocation (CAPACITY ALLOCATION) control frame. In the prior art, the HS-DSCH CAPACITY ALLOCATION control frame can merely be used for a group of UEs, and cannot be used for a single UE; while in this embodiment, the control frame may be expanded by adding a UE identifier in the control frame, to control the UE that currently establishes the standalone HS-DPCCH. A new H-RNTI/H-RNTI list field may be added in the control frame to carry the UE identifier, where the newly added field may carry an identifier of one UE, and may also carry identifiers of multiple UEs. Optionally, a cell radio network temporary identifier (C-RNT) may serve as the identifier of the UE. In an implementation manner, a format of the control frame added with the new H-RNTI/H-RNTI list field may be shown in FIG. 4.

In the specific application, a value of a field HS-DSCH credits in the control frame may be set to 0, which instructs the RNC to suspend sending the downlink data, and a value of a field HS-DSCH Interval and a value of a field HS-DSCH Repetition Period may be set to represent the specified time period, so as to control time when the RNC stops data transmission.

Manner 2:

In Manner 1, the RNC suspends sending the downlink data for the UE according to the instruction of the Node B. In this solution, after sending the indication information for indicating whether the user terminal supports the Standalone HS-DPCCH to the Node B, the RNC may actively suspend sending the downlink data to the Node B, and then wait for the Node B to send request information used for instructing the RNC to continue sending the downlink data for the user terminal. The Node B may send the request information after confirming that the standalone HS-DPCCH is successfully established. After receiving the request information, the RNC continues sending the downlink data for the user terminal to the Node B.

The Node B may carry the request information in an HS-DSCH CAPACITY ALLOCATION control frame or in a data frame (DATA FRAME) of an enhanced dedicated channel (Enhanced Dedicated Channel, E-DCH). The indication information may indicate that the Node B successfully establishes the standalone HS-DPCCH.

If the HS-DSCH CAPACITY ALLOCATION control frame is adopted, similar to that in Manner 1, a new H-RNTI/H-RNTI list field may be added to carry a UE identifier, and specifically, may carry an identifier of one UE, and may also carry identifiers of multiple UEs. A difference lies in that, a volume of data allowed to be transmitted may also be set in the field HS-DSCH credits.

Manner 3:

This solution is the same as Manner 2 in that, after sending the indication information to the Node B, the RNC actively suspends sending the downlink data to the Node B; and this solution is different from Manner 2 in that, the RNC does not need to wait for the Node B to send request information, but pre-estimates a delay time on its own, and sends downlink data, other than the indication information, for the user terminal to the base station after the delay time which starts from sending of the indication information. The delay time is approximately equal to a period of time from time when the RNC sends an indication information to time when the standalone HS-DPCCH is successfully established.

The RNC may estimate the delay time according to a transmission delay of an IUB interface between the RNC and the Node B and/or a use condition of a current signature, for example, multiply the transmission delay of the IUB interface by a coefficient to obtain the required delay time.

The RNC may also receive use information which is of the signature and is reported by the base station; and because the use information of the signature may reflect the establishment delay of the standalone HS-DPCCH to a certain extent, the RNC may estimate the delay time according to the use information of the signature. For example, an initial delay time may be preset, and the initial delay time is increased or decreased according to a change of the use information of the signature.

When the RNC needs a dedicated reserved signature for triggering the establishment of the standalone HS-DPCCH, the reserved signature cannot be selected for use during random access of the UE, and signatures other than the reserved signature can be selected for use during random access of the UE. Therefore, the number of reserved signatures may decide the number of users that can be triggered to establish the standalone HS-DPCCH at the network side in a period of time, and the number of signatures that may be selected during the random access of the UE decides a probability of collision detection in a random access process of the UE, so a configuration of the signature is quite critical. A configuration of the current signature is performed in the RNC; however, the RNC only maintains a signature resource pool, and specific allocation is implemented by the Node B, so that the RNC cannot obtain the use condition of the signature, and cannot accurately adjust the number of reserved signatures according to an actual use condition.

In this embodiment, the RNC may receive the use information which is of the signature (signature) and is reported by the base station, so as to adjust the number of reserved signatures according to the use information of the signature.

To enable the RNC to acquire the use information of the current signature, the Node B needs to bring in reporting of the signature, to report the use information of the current signature to the RNC, where the reporting is used to reflect whether the number of signatures reserved for the UE to establish the standalone HS-DPCCH in a period of time is reasonable. The reporting process may be implemented through a Common Measurement INITIATION process. The reported use information of the signature may specifically be a statistical value. The statistical value may be obtained through calculation in the following several manners:

In a manner, a statistical value that needs to be reported by the Node B, namely, a Report value may be:

$$\text{Report value} = \frac{\text{the number of } UEs \text{ that successfully establish the } standalone\ HS\text{-}DPCCH}{\text{the number of } UEs \text{ that are required to establish the } standalone\ HS\text{-}DPCCH},$$

where:

the number of UEs that successfully establish standalone HS-DPCCH feedback refers to the number of UEs that successfully establish the standalone HS-DPCCH feedback after the Node B delivers an instruction of triggering the UE to establish the standalone HS-DPCCH in a period of time; and the number of UEs that are required to establish the standalone HS-DPCCH refers to the number of UEs that needs to be triggered by the Node B to establish the standalone HS-DPCCH in a period of time.

The statistical value reflects the use condition of the current signature, and if the report value is small, it indicates that the users of the standalone HS-DPCCH are a lot and the number of signatures is small, so the RNC needs to consider increasing the number of reserved signatures; while if the report value is large, it indicates that the users of the standalone HS-DPCCH are a few and the number of signatures is large, so the RNC needs to consider reducing the number of reserved signatures.

In another manner, a statistical value that needs to be reported by the Node B, namely, a Report value may be:

$$\text{Report value} = \frac{\text{the number of } UEs \text{ that exceeds a preset threshold}}{\text{the number of } UEs \text{ that successfully establish the } standalone \text{ } HS\text{-}DPCCH}\begin{pmatrix} \text{time when the } standalone \\ HS\text{-}DPCCH \text{ is successfully established} - \\ \text{time when the Node } B \text{ receives} \\ \text{the indication information} \\ \text{or sends the trigger information} \end{pmatrix},$$

where:

the time when the standalone HS-DPCCH is successfully established refers to time when the Node B detects that the triggered UE establishes the standalone HS-DPCCH;

the time when the Node B receives the indication information or sends the trigger information refers to time when the Node B receives indication information which carries a UE capability and is sent by the RNC or time when the Node B decides to deliver the trigger information for the UE; and (the time when the standalone HS-DPCCH is successfully established—the time when the Node B receives the indication information or sends the trigger information) represents a establishment delay required by a certain UE for establishing the standalone HS-DPCCH. The network side may configure a preset threshold, and when the establishment delay of the UE exceeds the preset threshold, statistics about the number of UEs is collected in the numerator.

The number of UEs that successfully establish the standalone HS-DPCCH refers to the number of UEs that establish the standalone HS-DPCCH and are detected by the Node B in a period of time.

The statistical value reflects the use condition of the signature by collecting statistics about the establishment delay of the UE. If the statistical value is large, it indicates that the establishment delay of the UE is long, which may be caused by a small number of reserved signatures, and the RNC needs to increase the number of reserved signatures.

Because plenty of features are involved in signature allocation and the number of signatures is limited, when the RNC adjusts the signature allocation merely according to the statistical value reported in the foregoing two manners, signatures of features, other than the reserved signature, may be reduced and performance of the other features is affected.

To solve the problem, the RNC may require the Node B to report the number of signatures associated with the other features. Therefore:

In still another manner, if 2 ms and 10 ms common E-DCH resources both exist in a current system, the 2 ms and 10 ms resources correspond to different signatures, and to estimate the number of signatures corresponding to the 2 ms and 10 ms resources, for the 2 ms resource, a statistical value that needs to be reported by the Node B, namely, a Report value may be:

$$\text{Report value} = \frac{\text{the number of } UEs \text{ that successfully obtain the } 2ms \text{ resource}}{\text{the number of random access } UEs \text{ that complete for the } 2ms \text{ resource}},$$

where: the number of UEs that successfully obtain the 2 ms resource refers to the number of UEs that compete for the 2 ms resource and successfully obtain the 2 ms resource in a period of time; while the number of random access UEs that compete for the 2 ms resource refers to the number of UEs that select a signature corresponding to the 2 ms resource and intend to obtain the 2 ms resource through competition in a period of time. Because the number of random access UEs that compete for the 2 ms resource is detected by the Node B, in certain cases, the Node B can only decide, according to sending conditions of an ACK and a NACK, the number of random access UEs that compete for the 2 ms resource.

For the 10 ms resource, a statistical value that needs to be reported by the Node B, namely, a Report value may be:

$$\text{Report value} = \frac{\text{the number of } UEs \text{ that successfully establish the } 10ms \text{ resource}}{\text{the number of random access } UEs \text{ that compete for the } 10ms \text{ resource}},$$

where: the number of UEs that successfully obtain the 10 ms resource refers to the number of UEs that compete for the 10 ms resource and successfully obtain the 10 ms resource in a period of time; while the number of random access UEs that compete for the 10 ms resource refers to the number of UEs that select a signature corresponding to the 10 ms resource and intend to obtain the 10 ms resource through competition in a period of time.

The two report values for the 2 ms and 10 ms resources both consider use condition of a signature corresponding to a certain type of resources, and during the competition for the 2 ms/10 ms resource, the network side may not only consider whether a resource that a UE competes for exists, but also consider a current processing capability of the network side. When the processing capability of the network side is insufficient, a UE that competes for the 2 ms resource may only obtain the 10 ms resource. To take into account the foregoing condition in a statistical process, the Node B may further report resource information of a random access channel (RACH) of a Granted E-DCH. The RNC determines, after comprehensive consideration according to the information reported by the Node B, whether allocation of signatures of all features is reasonable.

Figure 5:
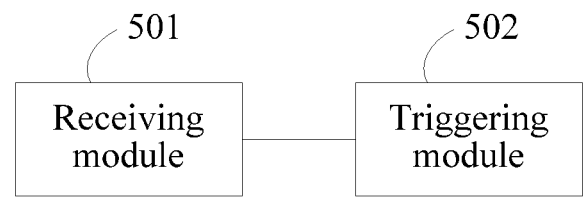
FIG. 5 is a schematic diagram of a base station according to an embodiment of the present invention.

Referring to FIG. 5, an embodiment of the present invention provides a base station, including: a receiving module 501, configured to receive indication information sent by a radio network controller, where the indication information is used for indicating whether a user terminal supports a Standalone HS-DPCCH or whether the radio network controller requires the base station to establish a standalone HS-DPCCH for a user terminal; and a triggering module 502, configured to send trigger information to the user terminal that supports the Standalone HS-DPCCH, so as to trigger the establishment of the Standalone HS-DPCCH.

In another embodiment of the present invention, the indication information may be carried in a reserved field of a frame protocol FP frame of downlink data.

In another embodiment of the present invention, the base station may further include: a sending module, configured to send reject information or request information to the radio network controller, where the reject information is used for instructing the radio network controller to suspend sending downlink data for the user terminal in a specified time period, and the request information is used for instructing the radio network controller to continue sending downlink data for the user terminal.

In another embodiment of the present invention, the base station may further include: an acquiring and reporting module, configured to acquire use information of a signature, and report the use information of the signature to the radio network controller.

In another embodiment of the present invention, the receiving module is further configured to receive information of one or more signatures corresponding to the standalone HS-DPCCH and delivered by the radio network controller; and the base station further includes: a selecting module, configured to, when the base station triggers the establishment of the standalone HS-DPCCH, select the information of one or more signatures and include the selected information in an HS-SCCH, so that the sending module sends the HS-SCCH to the UE, to trigger the UE to establish the standalone HS-DPCCH.

The base station provided by the embodiment of the present invention may acquire the indication information sent by the radio network controller, and acquire whether the UE supports the Standalone HS-DPCCH, so that the base station may send the trigger information to the UE that supports the Standalone HS-DPCCH, and does not need to send the trigger information to a UE that does not support the Standalone HS-DPCCH; therefore, a waste of HS-SCCH resources may be avoided, and a delay of downlink data scheduling of a UE may be reduced.

Figure 6:
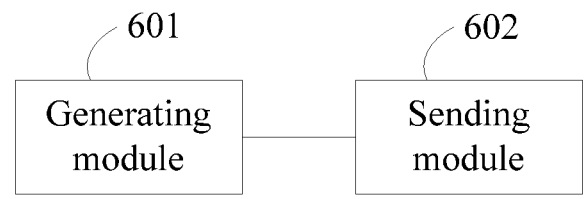
FIG. 6 is a schematic diagram of a radio network controller according to an embodiment of the present invention.

Referring to FIG. 6, an embodiment of the present invention provides a radio network controller, including: a generating module 601, configured to generate indication information, where the indication information is used for indicating whether a user terminal supports a Standalone HS-DPCCH or whether a base station is required to establish a standalone HS-DPCCH for a user terminal; and a sending module 602, configured to send the indication information to the base station, so that the base station sends trigger information to the user terminal that supports the Standalone HS-DPCCH.

In another embodiment of the present invention, the sending module 602 may be specifically configured to send the indication information to the base station by carrying the indication information in a reserved field of an FP frame of downlink data.

In another embodiment of the present invention, the sending module may be specifically configured to send the indication information for the user terminal to the base station; and after a pre-estimated delay time, send downlink data, other than the indication information, for the user terminal to the base station.

In another embodiment of the present invention, the radio network controller may further include: a receiving module, configured to receive reject information or request information sent by the base station; if receiving the reject information, instruct, according to the reject information, the sending module to suspend sending downlink data for the user terminal to the base station in a specified time period; and if receiving the request information, instruct, according to the request information, the sending module to continue sending downlink data for the user terminal to the base station.

In another embodiment of the present invention, the sending module is further configured to send information of one or more signatures corresponding to the standalone HS-DPCCH to the base station, so that when triggering the establishment of the standalone HS-DPCCH, the base station selects the information of one or more signatures and includes the selected information in an HS-SCCH to be sent to the UE, so as to trigger the UE to establish the standalone HS-DPCCH.

The radio network controller provided by the embodiment of the present invention may send the indication information to the base station, and notifies the base station of the information whether the UE supports the Standalone HS-DPCCH, so that the base station may send the trigger information to the UE that supports the Standalone HS-DPCCH, and does not need to send the trigger information to a UE that does not support the Standalone HS-DPCCH; therefore, a waste of HS-SCCH resources may be avoided, and a delay of downlink data scheduling of a UE may be reduced.

Persons skilled in the art may clearly understand that, for convenience and concision of description, dividing of the foregoing functional modules is taken as an example for description. In an actual application, the foregoing functions may be assigned, according to requirements, to different functional modules for implementation, that is, an internal structure of the apparatus is divided into different functional modules, to implement all or a part of the functions described above. For specific working processes of the foregoing system, apparatus and unit, reference may be made to a corresponding process in the foregoing method embodiment, and details are not repeatedly described herein.

In several embodiments provided in the present application, it should be understood that the disclosed system, apparatus, and method may be implemented in other ways. For example, the described apparatus embodiments are merely exemplary. For example, dividing of the modules or units is merely a kind of logical function dividing, and there may be other dividing manners in actual implementation. For example, multiple units or components may be combined or integrated into another system, or some features may be ignored or not performed. Furthermore, the shown or discussed mutual coupling or direct coupling or communication connection may be accomplished through some interfaces, and indirect coupling or communication connection between apparatuses or units may be electrical, mechanical, or in other forms.

Units described as separate components may be or may not be physically separated. Components shown as units may be or may not be physical units, that is, may be located in one place or distributed to a plurality of network units.

Some or all of the units may be selected to achieve the objective of the solution of the embodiment according to actual demands.

In addition, various functional units according to each embodiment of the present invention may be integrated in one processing unit or may exist as various separate physical units, or two or more units may also be integrated in one unit. The integrated unit may be implemented through hardware, or may also be implemented in a form of a software functional unit.

When the integrated unit is implemented in the form of the software functional unit and sold or used as a separate product, the integrated unit may be stored in a computer readable storage medium. Based on such understanding, the essence of the technical solutions of the present invention or the part that makes contributions to the prior art or all or a part of the technical solutions may be embodied in a form of a software product. The computer software product is stored in a storage medium, and includes several instructions to instruct a computer device (which may be a personal computer, a server, or a network device or the like) or a processor to perform all or a part of steps of the method as described in the embodiments of the present invention. The storage medium includes various media capable of storing program codes, such as, a USB flash drive, a mobile hard disk, a read-only memory (ROM), a random access memory (RAM), a magnetic disk or an optical disk.

The foregoing embodiments are merely provided for describing the technical solutions of the present invention, but not intended to limit the present invention. Although the present invention has been described in detail with reference to the embodiments, persons of ordinary skill in the art should understand that they may still make modifications to the technical solutions described in the embodiments, or equivalent replacements to some technical features in the technical solutions; however, these modifications or replacements do not make the essence of the corresponding technical solutions depart from the scope of the technical solutions of the embodiments of the present invention.

What is claimed is:

1. A method for establishing a standalone high speed dedicated physical control channel (Standalone HS-DPCCH) between a user terminal and a base station in a wireless communication system, comprising:
    receiving, by the base station, indication information sent by a radio network controller in the wireless communication system, wherein the indication information indicates whether the user terminal supports a Standalone HS-DPCCH; and
    sending, by the base station when the indication information indicates that the user terminal supports a Standalone HS-DPCCH, trigger information to the user terminal to trigger the user terminal to establish the Standalone HS-DPCCH between the user terminal and the base station;
    acquiring, by the base station, use information of a signature corresponding to the standalone HS-DPCCH, and reporting the use information of the signature to the radio network controller, wherein the reported use information comprises a report value that is equal to the number of user terminals that successfully establish the standalone HS-DPCCH divided by the number of user terminals that are required to establish the standalone HS-DPCCH; and
    adjusting, by the radio network controller, a number of reserved random access signatures corresponding to the standalone HS-DPCCH.

2. The method according to claim 1, wherein before receiving indication information sent by the radio network controller, the method further comprises:
    reporting, by the base station to the radio network controller through an audit procedure or a resource status indication procedure, information indicating that the base station or a certain cell under the base station supports the standalone HS-DPCCH.

3. The method according to claim 1, further comprising:
    receiving, by the base station, configuration information of a timer for resource release and sent by the radio network controller.

4. The method according to claim 1, wherein receiving the indication information comprises:
    receiving the indication information from the radio network controller through a frame protocol (FP) frame of downlink data for the user terminal.

5. A base station in a wireless communication system, comprising:
    a processor; and
    a non-transitory processor-readable medium having processor-executable instructions stored thereon;
    the processor being configured to execute the processor-executable instructions to perform operations comprising:
        receiving indication information sent by a radio network controller in the wireless communication system, wherein the indication information indicates whether a user terminal supports a standalone high speed dedicated physical control channel (Standalone HS-DPCCH),
        sending, when the indication information indicates that the user terminal supports a Standalone HS-DPCCH, trigger information to the user terminal to trigger the user terminal to establish the Standalone HS-DPCCH between the base station and the user terminal and
        acquiring use information of a signature corresponding to the standalone HS-DPCCH, and reporting the use information of the signature to the radio network controller, wherein the reported use information comprises a report value that is equal to the number of user terminals that successfully establish the standalone HS-DPCCH divided by the number of user terminals that are required to establish the standalone HS-DPCCH.

6. The base station according to claim 5, wherein the operations performed by the processor further comprise:
    acquiring use information of a signature corresponding to the standalone HS-DPCCH, and reporting the use information of the signature to the radio network controller.

7. The base station according to claim 5, wherein the operations performed by the processor further comprise:
    receiving configuration information of a timer for resource release and sent by the radio network controller.

8. The base station according to claim 5, wherein receiving the indication information comprises:
    receiving the indication information from the radio network controller through a frame protocol (FP) frame of downlink data for the user terminal.

* * * * *